Patented Nov. 8, 1932

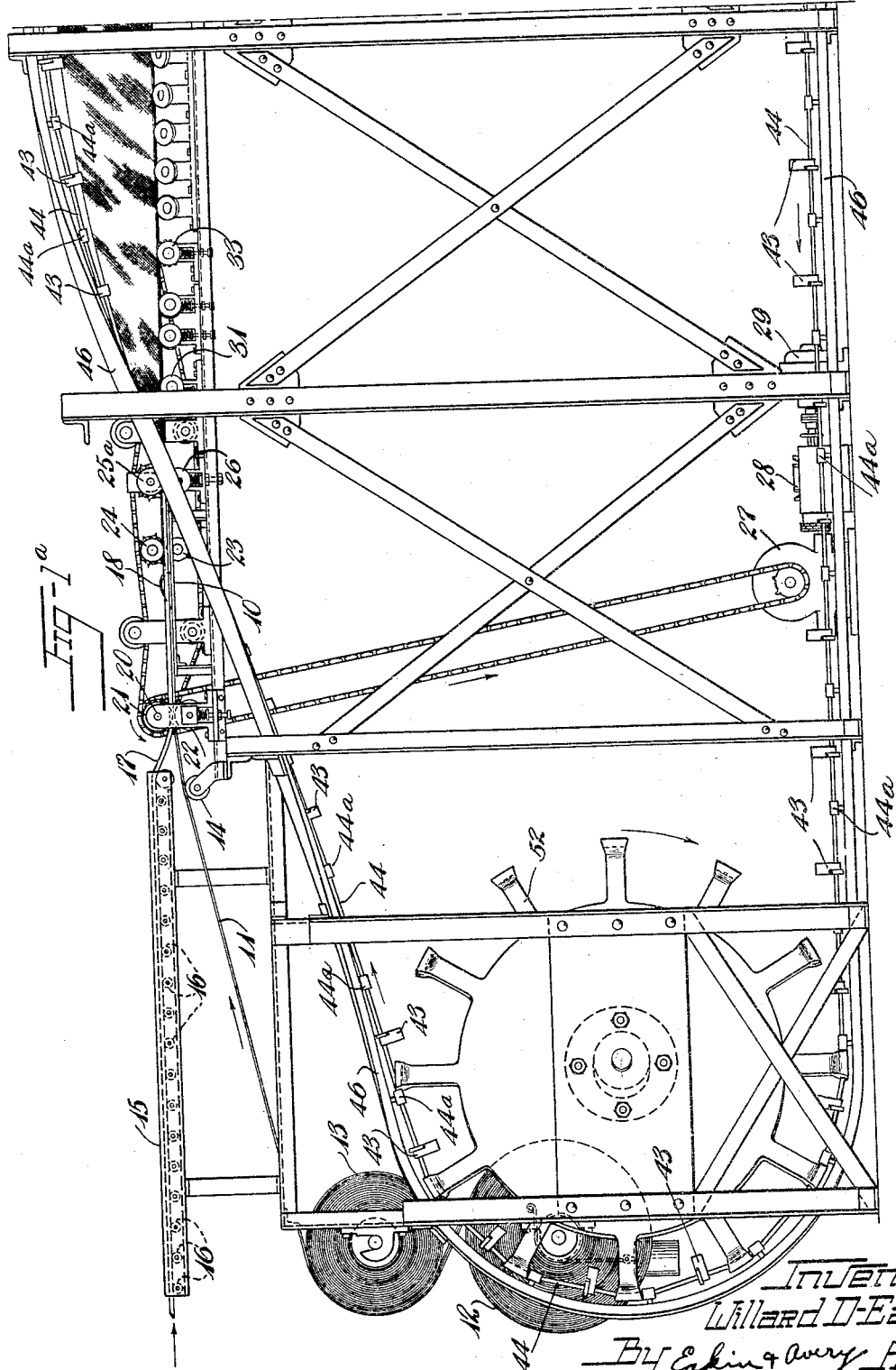

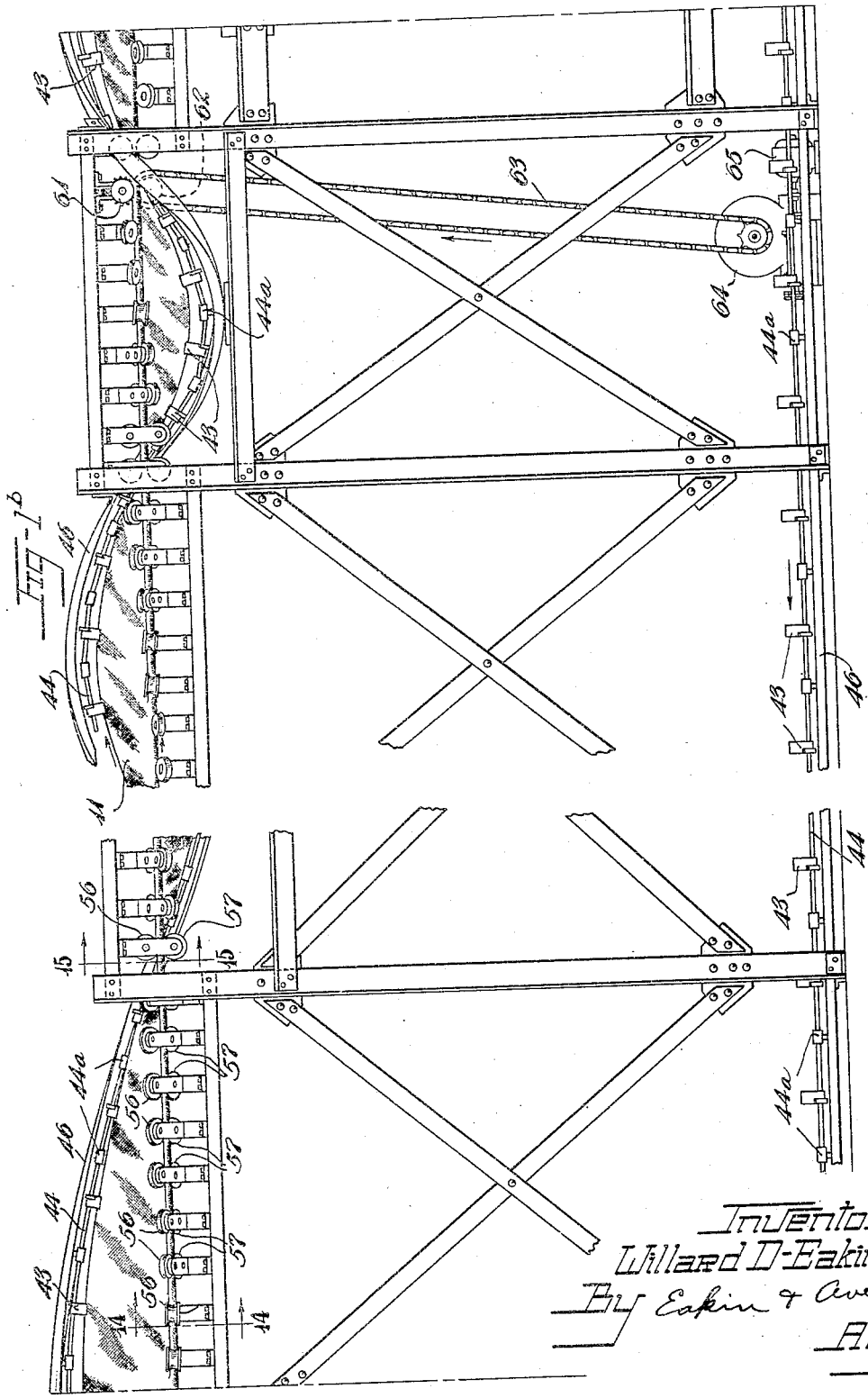

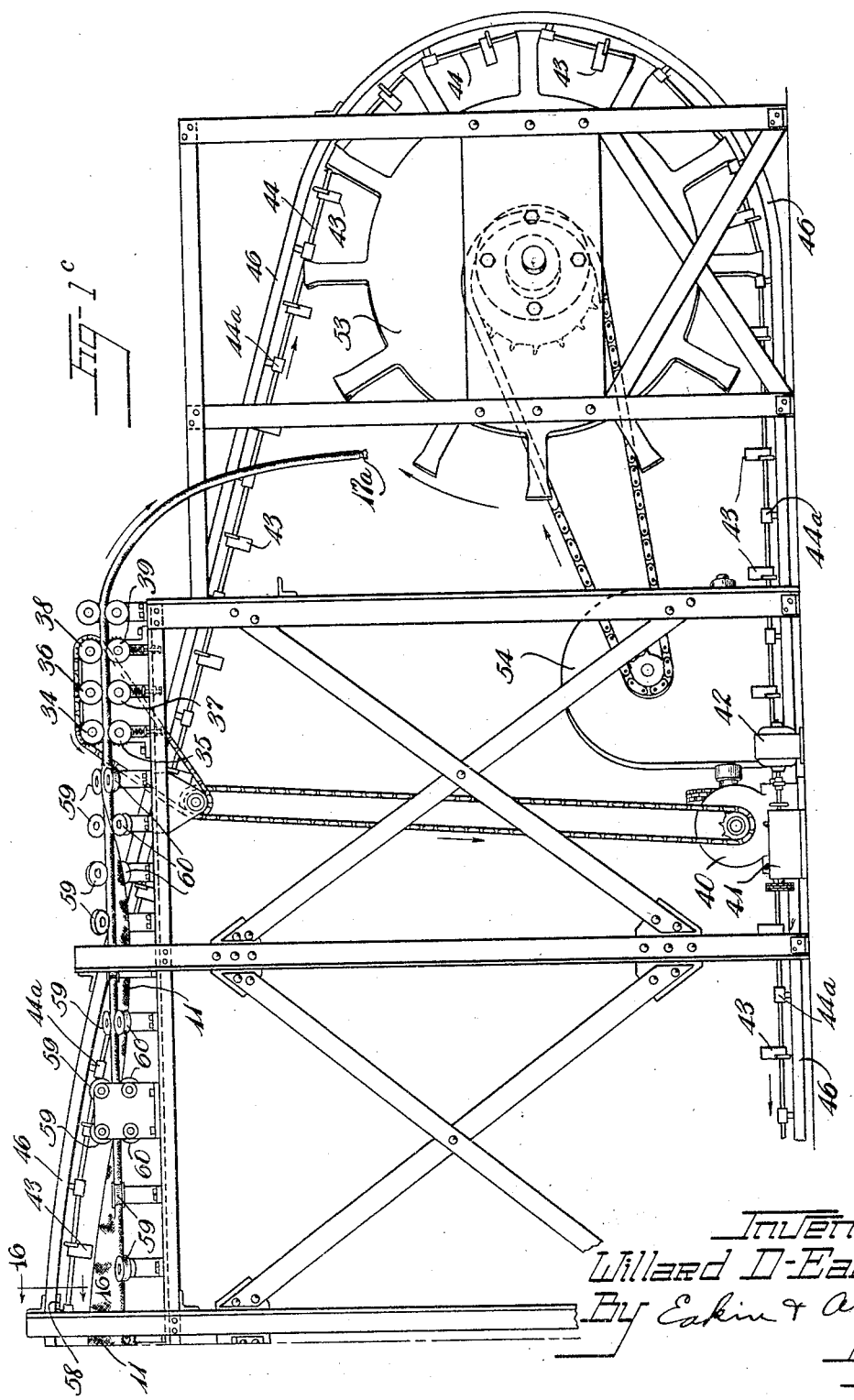

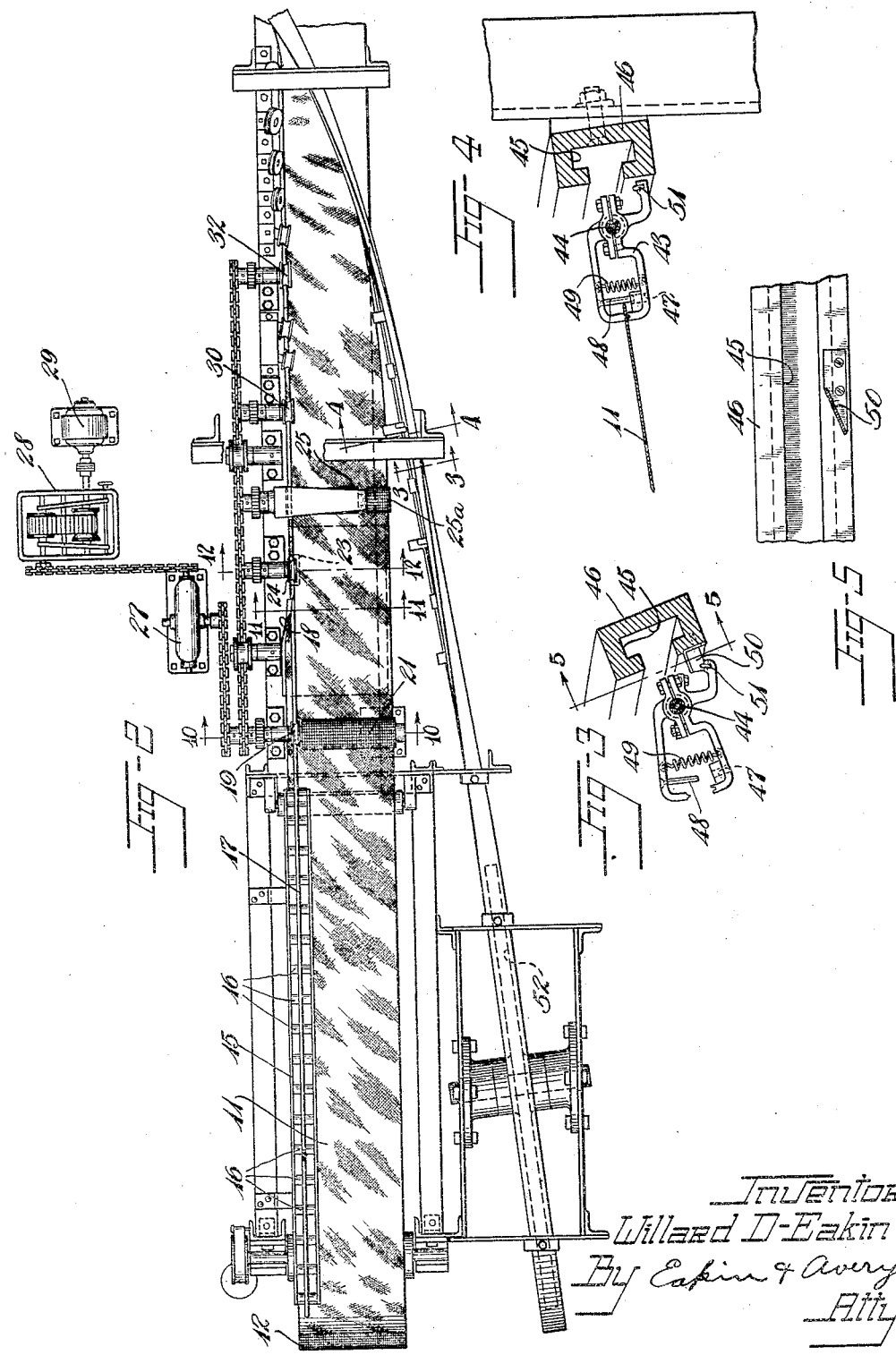

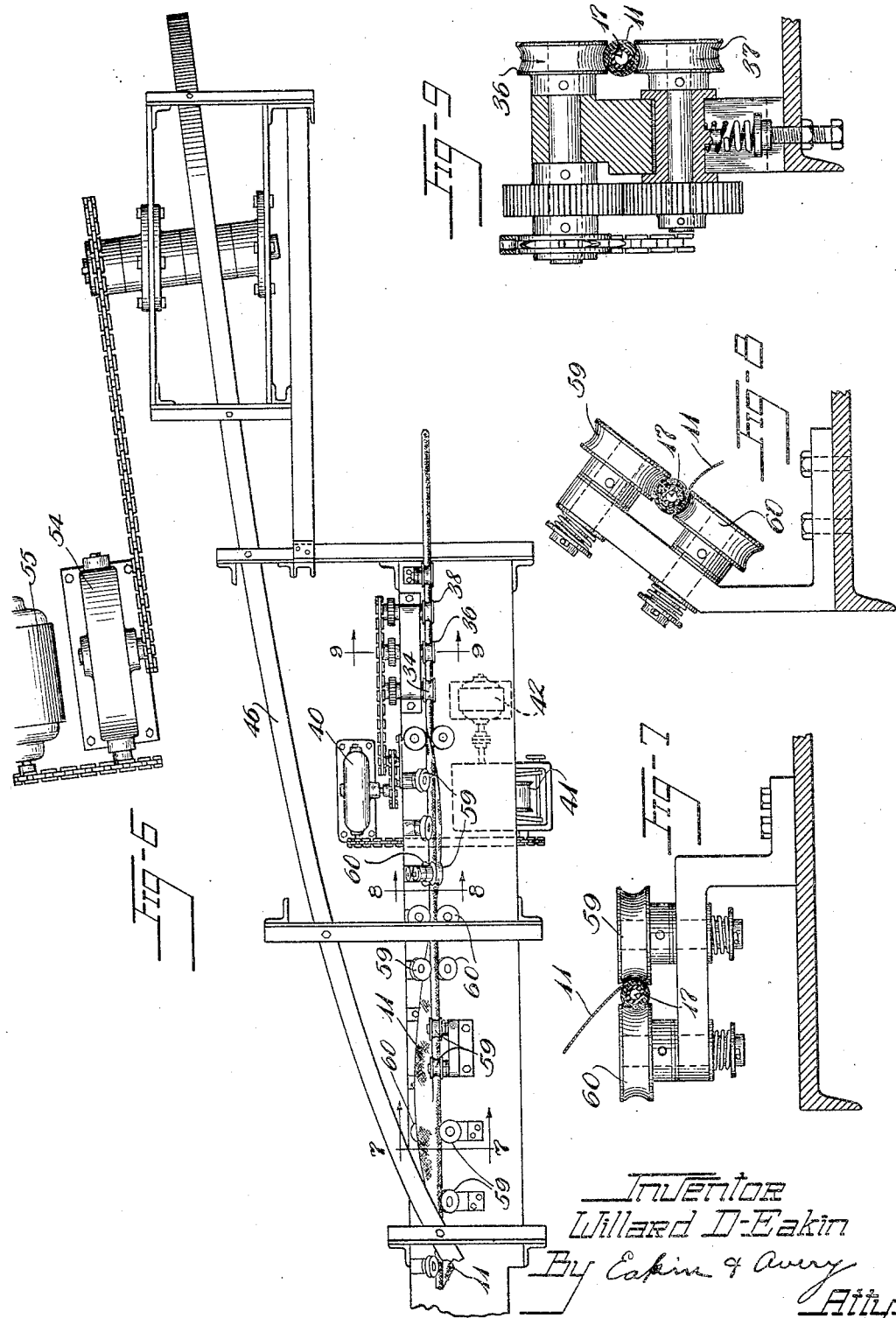

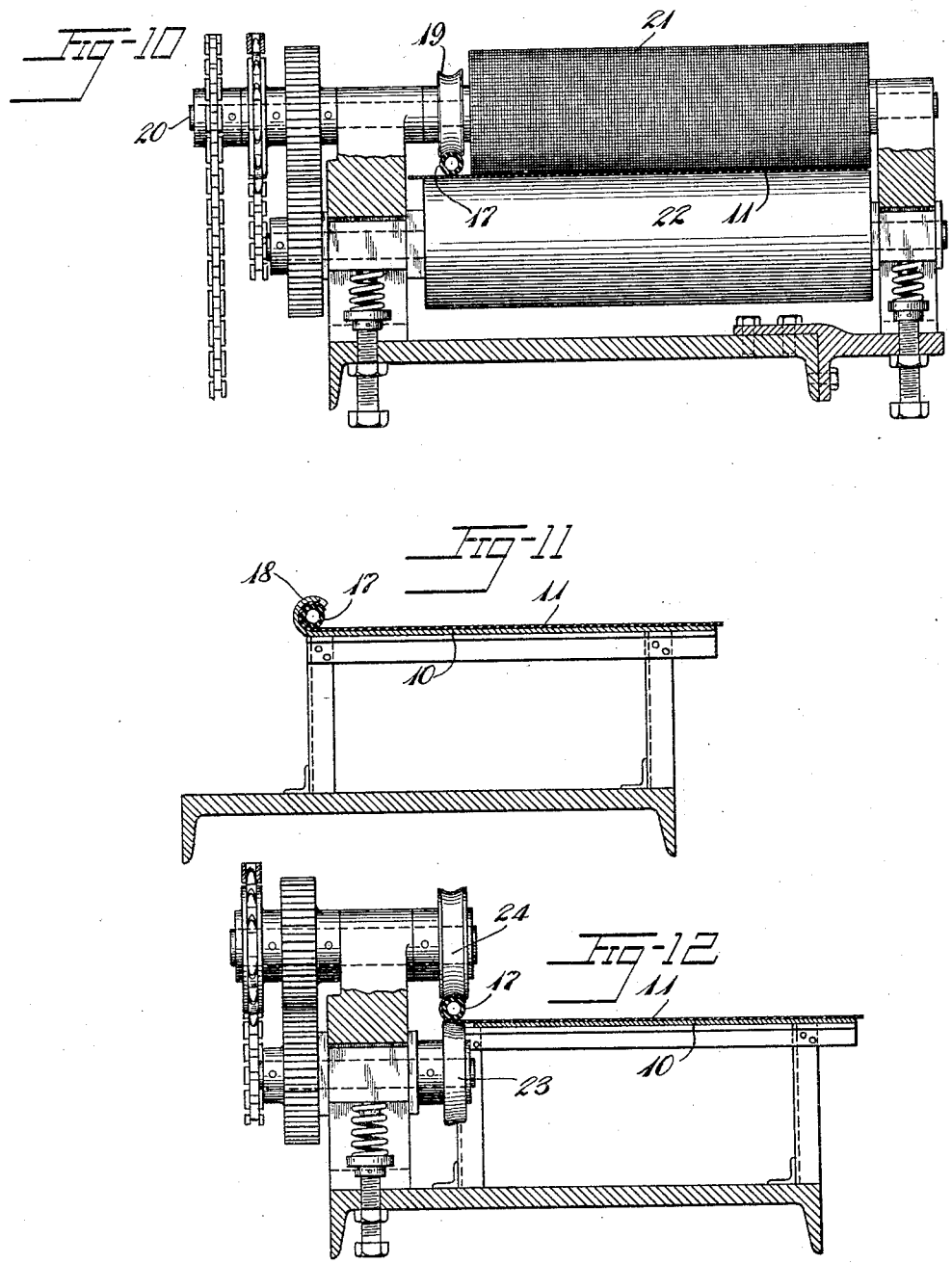

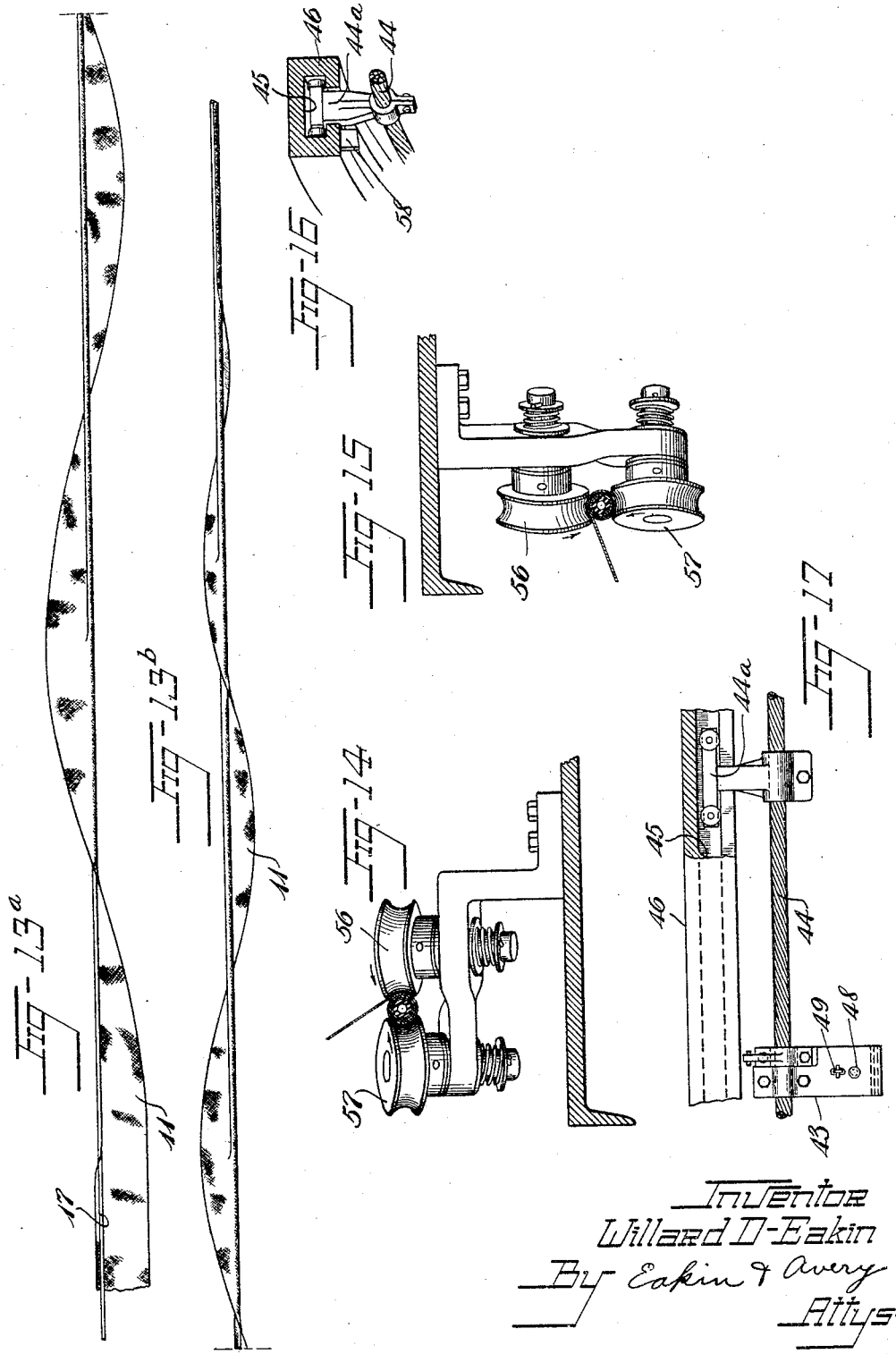

1,886,658

UNITED STATES PATENT OFFICE

WILLARD D. EAKIN, OF HUDSON, OHIO, ASSIGNOR TO THE B. F. GOODRICH COMPANY, OF NEW YORK, N. Y., A CORPORATION OF NEW YORK

METHOD AND APPARATUS FOR MAKING HOSE

Application filed January 9, 1930. Serial No. 419,573.

This invention relates to methods and apparatus for making hose, especially hose of the wrapped-fabric type.

Heretofore such hose has been made either by wrapping the fabric upon a mandrel, which has involved a great deal of labor, has limited the product to lengths no greater than that of the mandrel, and has practically necessitated the curing of the hose upon the mandrel on which it is wrapped; or by wrapping the fabric obliquely upon a rubber hose lining, which has permitted the wrapping of the fabric by progression lengthwise of the hose in a continuous process to produce hose of great length and has made it conveniently possible to cure the hose in a lead jacket under internal fluid pressure but has not provided a precisely straight-wrapped hose, because the oblique wrapping of the fabric which has permitted the wrapping operation to be effected by progression lengthwise of the hose has resulted in the longitudinal margins of the fabric having helical instead of straight form in the finished product, and it has not been convenient to maintain the fabric under high and uniform tension during the wrapping operation.

The chief objects of my invention are to provide improved procedure and to provide improved apparatus whereby truly straight-wrapped hose may be produced by a wrapping operation which is effected by progression lengthwise of the hose; thus to provide in an improved manner for the production of wrapped hose of great length; to provide for rapid production of wrapped hose; to provide for accurate wrapping of the fabric; to provide for wrapping the fabric under uniform tension; to provide economy of operation; and to provide a product of high quality.

Of the accompanying drawings:

Figs. 1—a, 1—b and 1—c together constitute a side elevation of apparatus embodying and adapted to carry out my invention in its preferred form, parts being broken away in Fig. 1—b to shorten the figure.

Fig. 2 is a plan view of the receiving end portion of the apparatus.

Fig. 3 is a section on line 3—3 of Fig. 2.
Fig. 4 is a section on line 4—4 of Fig. 2.
Fig. 5 is a section on line 5—5 of Fig. 3.
Fig. 6 is a plan view of the delivery end portion of the apparatus.
Fig. 7 is a section on line 7—7 of Fig. 6.
Fig. 8 is a section on line 8—8 of Fig. 6.
Fig. 9 is a section on line 9—9 of Fig. 6.
Fig. 10 is a section on line 10—10 of Fig. 2.
Fig. 11 is a section on line 11—11 of Fig. 2.
Fig. 12 is a section on line 12—12 of Fig. 2.
Figs. 13—a and 13—b together constitute a plan view of the work as it lies in the apparatus.
Fig. 14 is a section on line 14—14 of Fig. 1—b.
Fig. 15 is a section on line 15—15 of Fig. 1—b.
Fig. 16 is a section on line 16—16 of Fig. 1—c.
Fig. 17 is a fragmentary side elevation, with a part sectioned and broken away, of a tentering device and associated parts employed in the apparatus.

General description

The preferred embodiment of the invention here illustrated comprises means for longitudinally feeding a hose lining tube, means for so guiding a strip of hose fabric into association therewith as to apply one longitudinal margin of the fabric strip to the lining tube and means for so guiding the unapplied portion of the fabric strip in a helical path about the tube as to wrap it thereon in a plurality of superposed convolutions.

With lining tubes and fabric strips of the dimensions commonly used in the manufacture of hose it is found that the helical path required to be taken by the last applied margin of the fabric strip, with the fabric held transversely taut, is not prohibitively greater in length than the direct longitudinal path taken by the hose lining, in an apparatus of moderate length, and accordingly only a small percentage of stretch in the last applied margin is incident to its following the helical path, even in an apparatus of moderate length adapted to provide a five-ply hose of fairly large diameter, that the bias fabric strip commonly employed may be given such percentage of stretch in its outer margin without excessive strain.

The unapplied portion of the fabric strip preferably is fed in the helical path while being held transversely taut by engagement with its last applied margin only, and the feeding of the said margin in the helical path with its component of motion longitudinal of the machine equal in speed to that of the lining tube has the result that each element of the fabric initially lying at right angles to the axis of the tube is caused to assume the form of a true spiral, so that it lies substantially in the same transverse plane in the wound structure, which is to say that the finished product is a truly straight-wrapped hose, in which permissibly the longitudinal edges of the fabric strip lie parallel with the axis of the hose, although the wrapping is effected by progression lengthwise of the hose and is thus performed as a continuous operation.

Preferably the means for feeding the fabric in the helical path and holding it transversely taut comprises a series of gripper devices mounted in spaced-apart relation on an endless flexible element having means for guiding it in an orbital path including the helical path about the lining tube and preferably automatic means are employed for causing the gripper devices to engage the free margin of the fabric at a determinate position near the approach end of the helical path and to release the margin at a position near the other end of the helical path, at which latter position the fabric has been almost completely wound upon the lining tube.

Hold-back means for the unapplied margin of the fabric preferably is provided at a position very close to that at which the succession of gripper devices engage the margin, so that the said margin of the fabric will be constrained to move longitudinally at the same speed as that of the lining tube at the position of the hold-back means, with the result that the determinate percentage of stretch will be imparted to the fabric margin, by the movement of the last-engaged gripper device away from the hold-back means, at the beginning of the helical path, the same percentage of stretch then being maintained by the engagement of the spaced gripper devices with the margin of the fabric while they continue to move forward in the helical path.

In order that all portions of the unapplied margin may move at constant speed from point to point in the helical path notwithstanding the progressive shortening of the radius of the helix incident to the winding of the fabric onto the lining tube, the pitch of the helix is progressively less, each turn of the helix is progressively less, each turn of the helix being shorter than the one last traversed by the fabric margin, and this variation in the pitch of the helix makes it possible to employ the flexible element, having the gripper devices spaced thereon, with means for driving the flexible element, to feed the fabric margin in the desired determinate path and at the desired uniform speed from point to point in the helical path, with the forward component of movement equal in speed to that of the lining tube.

The desired transverse tension of the unapplied portion of the fabric strip and the desired accuracy in the application of the fabric to the lining tube is preferably obtained by providing that each of the gripper devices shall engage the fabric margin to the same determinate depth, by providing fixed guiding means to assure that the said margin's edge will follow accurately the determinate helical path, and by providing means for applying a rotative force to the lining tube as it moves forward so that the fabric will be tensioned between the lining tube and the gripper devices, actual rotation of the tube, however, being substantially prevented by the determinate holding of the fabric in a tentered condition by the gripper devices.

The preferred means for applying the said rotative force to the lining tube comprises successive pairs of idler pinch rolls spaced longitudinally of the machine, with the axes of the rollers of each pair disposed at a slight angle to each other, so that they have a slight transverse wiping action upon the hose lining or the partially wrapped work embraced between them such as to impart thereto a rotative force in such direction as to keep the fabric transversely taut.

*Detailed description*

The apparatus comprises a table 10 mounted in suitable framing and adapted to receive in sliding relation thereon a strip of hose fabric 11 drawn from a suitably journaled and braked stock roll 12 and over a liner rewinding roll 13 and a guide roll 14 (Figs. 1—a and 2).

A guideway 15 having anti-friction work-supporting rollers 16, 16 is provided for supporting and guiding onto one margin of the fabric strip 11, as the latter passes over the table 10, a hose-lining tube 17, which may have its ends closed as shown at 17ª (Fig. 1—c), by means of constricting bands, to retain a super-atmospheric pressure therein and thus to provide resistance to excessive deformation of the tube in cross-section.

A folding horn 18 is mounted in position to fold the said margin of the fabric partly around the hose-lining tube, as shown clearly in Figs. 2 and 11. A grooved guiding and pressing roller 19 (Figs. 2 and 10) is loosely journaled upon the same shaft 20 with a knurled fabric feeding roller 21, which is secured upon the shaft, and the knurled roller 21, engaging the upper face of the fabric, coacts with a smooth roll 22, yieldingly engaging the lower face of the fabric, to feed the fabric at determinate speed as it approaches the table 10.

At a position to operate upon the work as it leaves the folding horn 18, a yieldingly mounted supporting roller 23 engaging the under side of the work and a grooved roller 24 engaging the upper side of the work (Figs. 1—a, 2 and 12) are adapted to press in place the margin of the fabric which has been folded by the horn 18 and to feed that side of the work which includes the hose-lining tube 17 at an appropriate speed, for which purpose there is provided also a sectional roller 25—25ª engaging the upper face of the fabric and coacting with a yieldingly mounted roller 26 engaging the lower face of the fabric, the rollers 21, 24 and 25—25ª having driving connection, through a reduction gear 27 and a variable speed device 28, with a synchronous motor 29. The same driving connection also extends to two pairs of pinch rollers 30—31 and 32—33 (Figs. 1—a and 2) which engage the partly covered hose lining at a more advanced position to guide it and feed it forward through the apparatus.

For feeding the completed work at the delivery end of the machine at suitable speed three pairs of pinch rollers 34—35, 36—37, 38—39 (Figs. 1—c and 6) have driving connection through a reduction gear 40 and a variable speed device 41 with a synchronous motor 42 adapted to run at a suitable speed with relation to that of the motor 29 at the receiving end of the apparatus.

For engaging the unapplied margin of the fabric strip at a position closely adjacent the speed-controlling or hold-back sectional roll 25—25ª and for constraining the said margin to move in a determinate helical path about the hose-lining tube and at an even speed throughout the helical course, a series of gripper devices 43, 43 are clamped upon an endless cable 44 which has clamped thereon, between the gripper devices, a series of wheeled carriages 44ª—44ª running in an undercut, endless guideway 45 (see Fig. 16) formed in a guide rail 46 which is so shaped as to guide the cable in its endless course including the helical path about the hose-lining tube.

Each of the gripper devices comprises a pair of tentering jaws of the type in which one jaw is formed with a hole 47 adapted to receive a pin 48 mounted on the other jaw (see Figs. 3 and 4) when the jaws have been closed by a connecting pull string 49 and the fabric has slipped to an extent such as to uncover the hole 47, the gripper device thus being adapted always to engage the fabric to the same determinate depth, as shown in Fig. 4.

The course of the cable 44 past the sectional hold-back roll 25—25ª has such oblique relation to the work (see Fig. 2) as to bring the gripper devices in succession into operative relation to the adjacent margin of the fabric, the cable 44 being held by the carriages 44ª in a torsional position such that the gripper devices project toward the work in position to receive the fabric between their jaws, and a cam member 50 (Figs. 3 and 5) being mounted on the guide rail 46 in position to coact with a cam roller 51 (Fig. 3) mounted upon a rearward extension of one of the hinged jaw members to cause the jaws to open momentarily in passing into association with the fabric and then permit them to close thereon as the roller 51 passes from the cam 50.

As is shown in Figs. 1—a, 1—b, 1—c, 13—a and 13—b, the helical course of the cable has a decreasing pitch, and a correspondingly decreasing radius, each turn being shorter and of less radius than the last, and the guide rail 46 is thus so shaped that with the grippers moving at equal speed in the helical path, all being clamped to the same cable, the wrapping of the fabric about the hose-lining tube will be in a direction at right angles to the latter's axis throughout the helical path.

At the receiving end of the machine the cable 44 is mounted upon an idler wheel 52 formed with radial arms grooved in their outer ends to engage the cable 44 between the gripper devices 43 and carriages 44ª mounted thereon, to cause the cable assembly to pass smoothly along the curve of the guide rail 46, and at the delivery end of the machine a similar wheel 53 is mounted in the loop of the cable and has driving connection through a reduction gear 54 with a synchronous motor 55 driven in suitably timed relation to drive the cable and thus move the gripper devices at the proper speed.

The construction as described is such that each gripper device in succession engages the adjacent, unapplied margin of the fabric strip at the same position and ultimately to the same depth, and as each gripper device moves away from the hold-back roll 25—25ª at a speed appropriately greater than that of the hold-back roll, this being the position at which the helical path of the gripper devices begins, the fabric is stretched to a determinate percentage, representing the difference between the forward speed and the helical speed of the work, until the fabric margin is engaged by the next following gripper device, which then, in its turn, imparts the determinate percentage of stretch to the next length of the fabric margin.

The means for imparting a rotative force to the partly wrapped hose-lining tube comprises a series of pairs of grooved pinch rolls 56—57, 56—57 having their mountings so disposed and being so shaped and so embracing the work that the unapplied portion of the fabric, throughout the helical course, may extend tangentially from the hose-lining tube, transversely of the work, to the determinate helical path of the unapplied margin of the fabric (see especially Figs. 14 and 15).

The rollers of each pair 56—57 are mounted upon axes slightly oblique to each other, as is shown clearly in Figs. 14 and 15, in such relation that they apply to the work a wiping force which is opposite in direction on the two sides thereof and they thus apply to the partly wrapped tube a rotative force in a direction such as to tension the unapplied portion of the fabric against the anchorage provided by the gripper devices, the said rotative force being counteracted, however, by the anchorage of the fabric margin, so that the fabric is wrapped under transverse tension, actual rotation of the partly wrapped tubing being substantially avoided by wiping slippage of the rollers 56—57 upon the work.

For releasing the gripper devices 43 from the fabric margin near the delivery end of the machine, when the fabric has been almost completely wound upon the lining tube, a cam 58 (see Figs. 1—c and 16) is mounted upon the guide rail 46 in position to engage the roller 51 (Fig. 3) of each gripper device in succession and momentarily open its jaws so that it releases the fabric and, proceeding in a course diverging from that of the fabric margin, as shown in Fig. 1—c, passes out of association with the fabric.

For then wrapping the rest of the fabric margin onto the underlying structure, a series of pairs of folding rollers 59—60, 59—60, the rollers of each pair being mounted upon axes parallel to each other, are mounted in position to embrace the work and carry the wrapping operation helically about the same, as shown clearly in Figs. 1—c, 6, 7 and 8.

For driving the partially wrapped tube at one or more intermediate positions in the helical course and thus to avoid excessive strain upon the work, pairs of driving rollers such as are shown at 61—62 (Fig. 1—b) may be mounted in position to engage the work and connected, as through the sprocket chain 63, reduction gear 64 and other suitable connections, with a synchronous motor such as the motor 65.

The operation of the apparatus will be entirely clear from the foregoing description, and its advantages will be manifest in the light of the foregoing statement of objects.

I claim:

1. The method of making hose which comprises attaching a strip of hose-fabric to a hose-lining tube with its edge extending substantially in a directly longitudinal direction with relation to the tube and by progression lengthwise of the tube so wrapping the fabric strip about the tube in a plurality of integral, superposed convolutions, as measured from the longitudinal line of initial contact, as to cause respective elements of the fabric initially perpendicular to the axis of the tube to lie throughout substantially in a transverse plane in the wrapped structure.

2. A method as defined in claim 1 in which the last-applied margin of the fabric is subjected to a determinate percentage of stretch locally in the region where it starts its course about the tube.

3. A method as defined in claim 1 in which the tube is fed longitudinally without substantial rotation and the last-applied longitudinal margin of the fabric strip is fed through a helical path about the tube.

4. A method as defined in claim 1 in which the tube is fed longitudinally and the last-applied longitudinal margin of the fabric strip is fed through a determinate helical path about the tube and the fabric is kept transversely taut by a rotative force applied to the tube which is resisted by the maintenance of the said margin in the said determinate helical path.

5. A method as defined in claim 1 in which the tube is fed longitudinally without substantial rotation and the transversely projecting, unapplied portion of the fabric strip is fed in a helical path about the tube by engagement substantially with only its outer marginal portion.

6. The method of making hose which comprises longitudinally feeding a hose-lining tube and a strip of hose-fabric having one of its longitudinal margins joined thereto while feeding the other longitudinal margin of the fabric strip in a determinate helical path about the tube to wrap the fabric thereon, successive turns of the helical path being so progressively shorter that the speed of the said other margin along the helical path may be constant from point to point while its speed in the direction lengthwise of the tube is equal to the speed of the tube.

7. Hose-making apparatus comprising means for attaching a strip of hose-fabric to a hose-lining tube with its edge extending substantially in a directly longitudinal direction with relation to the tube and means acting by progression lengthwise of the tube for so wrapping the fabric about the tube in a plurality of integral, superposed convolutions, as measured from the longitudinal line of initial contact, as to cause respective elements of the fabric initially perpendicular to said edge to lie throughout substantially in a transverse plane in the wrapped structure.

8. Apparatus as defined in claim 7 including holding means coacting with the wrapping means to subject the last-applied margin of the fabric to a determinate percentage of stretch locally in the region where its starts its course about the tube.

9. Hose-making apparatus comprising means for longitudinally feeding a hose-lining tube without substantial rotation thereof, and means for so guiding in a helical path about the tube the unapplied portion of a strip of hose-fabric having one of its longitudinal margins attached to the tube as to wrap the fabric strip about the tube in a plurality of integral superposed convolutions and to cause respective elements of the fabric initially perpendicular to the tube to lie throughout substantially in a transverse plane in the wrapped structure.

10. Apparatus as defined in claim 9 in which the guiding means is so constructed and arranged as to feed the last-applied longitudinal margin of the fabric strip in a determinate helical path and including means for keeping the fabric transversely taut by a rotative force applied to the tube and resisted by the maintenance of the said margin in the said determinate helical path.

11. Apparatus as defined in claim 9 in which the guiding means is constructed and arranged to guide and laterally tension the fabric by engagement with the last-applied margin only of the fabric strip.

12. Apparatus as defined in claim 9 in which the guiding means is constructed and arranged to grip the last-applied margin of the fabric strip and move forward therewith in a helical path of which the successive turns are of such decreasing length that the speed of the guiding means along the helical path may be constant from point to point while its speed in the direction lengthwise of the tube is equal to the speed of the tube.

13. Hose-making apparatus comprising means for longitudinally feeding a hose-lining tube without substantial rotation thereof, a flexible element, means for guiding said flexible element in a helical path about the tube so fed, and gripper devices mounted in spaced-apart relation on said element and adapted to grip the margin of a strip of hose-fabric.

14. Apparatus as defined in claim 13 including means for automatically actuating the gripper devices at a determinate position in their path.

15. Apparatus as defined in claim 13 including means for controlling the speed of the unapplied margin of a strip of hose-fabric having its other margin attached to the hose-lining tube and means for automatically closing the gripper devices upon the said unapplied margin at a position in their path closely adjacent the said controlling means.

16. Hose-making apparatus comprising means for longitudinally feeding a hose-lining tube without substantial rotation thereof, a flexible element, means for guiding said flexible element in a helical path of successively shorter turns about the tube so fed, and gripper devices mounted in spaced-apart relation on said element and adapted to grip the margin of a strip of hose-fabric.

17. Hose-making apparatus comprising means for attaching one longitudinal margin of a strip of hose-fabric to a hose-lining tube and for applying it, by progression to its adjacent edge, to the tube, and means for so wrapping the fabric in the other direction about the tube by progression lengthwise of the tube as to provide a plurality of integral, superposed convolutions of the fabric upon the tube and cause elements of the fabric initially perpendicular to the tube to lie throughout substantially in a transverse plane in the wrapped structure.

18. Hose-making apparatus comprising means for longitudinally feeding a hose-lining tube without substantial rotation thereof, means adapted to grip the unapplied margin of a strip of hose-fabric having its other margin attached to the tube and to move forward therewith in a helical path about the tube, and additional means for wrapping the last-applied margin of the strip onto the underlying structure after it has been released from the said gripping means.

19. Hose-making apparatus comprising means for longitudinally feeding a hose-lining tube, means for guiding in a helical path about the tube a strip of hose-fabric having one of its longitudinal margins attached to the tube, to wrap the fabric about the tube, the said guiding means comprising a flexible element, a guide therefor and grippers thereon, means engaging the tube at positions closely spaced-apart longitudinally of the tube to guide it and resist rotation of it by transverse tension of the fabric strip, and supports for the tube-guiding means and for the aforesaid guide so formed and positioned as to permit the fabric strip, transversely of the tube, to lie tangent thereto throughout a substantial portion of the said helical path.

20. Hose-making apparatus comprising means for longitudinally feeding a hose-lining tube, a gripper adapted to engage the unapplied margin of a strip of hose-fabric having its other margin attached to said tube, means for guiding said gripper in a determinate helical path about the tube, and means for causing the gripper to engage the margin of the fabric with the edge of the latter at a determinate position with relation to the gripper.

In witness whereof I have hereunto set my hand this 18th day of December, 1929.

WILLARD D. EAKIN.